United States Patent
Hayashi et al.

(10) Patent No.: US 7,049,931 B2
(45) Date of Patent: May 23, 2006

(54) ELECTRONIC VEHICLE THEFT PREVENTIVE DEVICE

(75) Inventors: Masaki Hayashi, Aichi (JP); Hirokazu Shamoto, Aichi (JP); Masaki Yoshino, Aichi (JP); Toshihiro Nagae, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 148 days.

(21) Appl. No.: 10/433,819

(22) PCT Filed: Feb. 8, 2002

(86) PCT No.: PCT/JP02/01114

§ 371 (c)(1),
(2), (4) Date: Jun. 6, 2003

(87) PCT Pub. No.: WO02/062636

PCT Pub. Date: Aug. 15, 2002

(65) Prior Publication Data

US 2004/0027239 A1  Feb. 12, 2004

(30) Foreign Application Priority Data

Feb. 9, 2001 (JP) .............................. 2001-033892
Oct. 19, 2001 (JP) .............................. 2001-322816

(51) Int. Cl.
G05B 19/00 (2006.01)
G06F 7/00 (2006.01)
G08B 29/00 (2006.01)
H04B 1/38 (2006.01)
H04Q 1/00 (2006.01)

(52) U.S. Cl. .................. 340/5.61; 340/5.62; 340/426.31

(58) Field of Classification Search ............... 340/5.61, 340/5.62, 426.31; 180/287; 70/186, 252; 307/10.2, 10.5, 10.6
See application file for complete search history.

(56) References Cited

U.S. PATENT DOCUMENTS

| 4,209,709 A | * | 6/1980 | Betton ..................... 307/10.4 |
| 4,345,665 A | * | 8/1982 | Fohl ........................ 180/270 |
| 4,688,036 A | * | 8/1987 | Hirano et al. .............. 340/5.62 |
| 4,965,460 A |   | 10/1990 | Tanaka et al. |
| 5,396,215 A | * | 3/1995 | Hinkle ................... 340/426.17 |
| 5,528,086 A | * | 6/1996 | Maass et al. ............. 307/10.5 |
| 5,595,257 A |   | 1/1997 | Yoshida et al. |
| 5,623,245 A | * | 4/1997 | Gilmore ................ 340/426.12 |
| 5,654,689 A |   | 8/1997 | Peyre et al. |
| 5,841,361 A |   | 11/1998 | Hoffman |

(Continued)

FOREIGN PATENT DOCUMENTS

EP  0 733 522 A1  9/1996

(Continued)

Primary Examiner—Michael Horabik
Assistant Examiner—Nam Nguyen
(74) Attorney, Agent, or Firm—Crompton, Seager & Tufte, LLC

(57) ABSTRACT

A steering wheel locking apparatus having high reliability. A steering lock apparatus (1) includes a lock pin (21) engaged with a steering wheel (5), a motor (23) for moving the lock pin, and an ECU (31) for controlling the motor. A switch (61) is arranged in a first power supply line (81) for supplying the motor with current. When supplying an electrical component with current, the switch breaks the first power supply line.

19 Claims, 10 Drawing Sheets

U.S. PATENT DOCUMENTS

| | | | |
|---|---|---|---|
| 5,949,151 A * | 9/1999 | Nakajima | 307/10.3 |
| 6,108,188 A | 8/2000 | Denison et al. | |
| 6,400,041 B1 * | 6/2002 | Engelmann et al. | 307/10.2 |
| 6,548,915 B1 * | 4/2003 | Geber et al. | 307/10.2 |
| 2004/0090124 A1 | 5/2004 | Gerber et al. | |

FOREIGN PATENT DOCUMENTS

| | | |
|---|---|---|
| JP | 59-014555 | 1/1984 |
| JP | 59-192646 | 11/1984 |
| JP | 1-147765 | 10/1989 |

* cited by examiner

ELECTRONIC VEHICLE THEFT PREVENTIVE DEVICE

BACKGROUND OF THE INVENTION

The present invention relates to an automobile anti-theft apparatus, and more particularly, to an electronic anti-theft apparatus.

FIG. 13 shows a prior art mechanical steering wheel lock apparatus 51 for preventing the theft of a vehicle. The steering wheel lock apparatus 51 has a key cylinder 54 and a lock pin 52. A mechanical key, which is not shown in the drawing, is inserted into the key cylinder 54. The lock pin 52 is moved in accordance with the rotation of the mechanical key. When the lock pin 52 is connected to part of a steering mechanism of the vehicle, i.e., a steering shaft 53, rotation of the steering shaft 53 is prohibited. This disables turning of a steering wheel.

In recent years, electronic key systems, which start an engine without inserting a key into the key cylinder 54, have become popular. Accordingly, an electronic steering wheel lock apparatus, which electrically controls an actuator, such as a motor, to lock a steering wheel, has been manufactured. However, electrical noise may cause the electronic steering wheel lock apparatus to be actuated erroneously. Therefore, there is a demand for an electronic steering wheel local apparatus having high reliability.

SUMMARY OF THE INVENTION

It is an object of the present invention to provide a highly reliable electronic anti-theft apparatus.

To achieve the above object, the present invention provides an electronic apparatus for preventing theft of a vehicle. The apparatus has a locking means for selectively locking a movable component that is operated when the vehicle is being driven, an actuator for moving the locking means, and a control circuit for controlling the actuator. The control circuit includes a first power supply line for supplying the actuator with current for moving the movable component, a second power supply line for supplying current to an electrical component of the vehicle with current to activate the electrical component, and a switching device for breaking the first power supply line when the vehicle is started.

The electronic apparatus further preferably includes a lock position detection switch connected in parallel with the switching device. The lock position detection switch is opened when locking with the locking means is released and closed when the locking means locks the movable component.

In one aspect, the switching device is switched between a first position connecting a first contact pair, which is arranged in the first power supply line, and a second position connecting a second contact pair, which is arranged in the second power supply line.

In another aspect, the switching device is a relay including a movable terminal selectively connecting a first contact pair, which is arranged in the first power supply line, and an attraction element for attracting the movable terminal to disconnect the first contact pair when current flows through the second power supply line.

In a further aspect, the switching device mechanically switches the second power supply line to a connected state when a first contact pair of the first power supply line is disconnected.

DETAILED DESCRIPTION OF THE PREFERRED EMBODIMENTS (First Embodiment)

An electronic anti-theft apparatus according to a first embodiment of the present invention is described hereinafter with reference to FIGS. 1 through 3. The anti-theft apparatus locks a movable component 5 that moves when a vehicle is being driven. The movable component 5 includes, for example, a steering shaft 5, wheels, and a shift lever.

Figure 1:
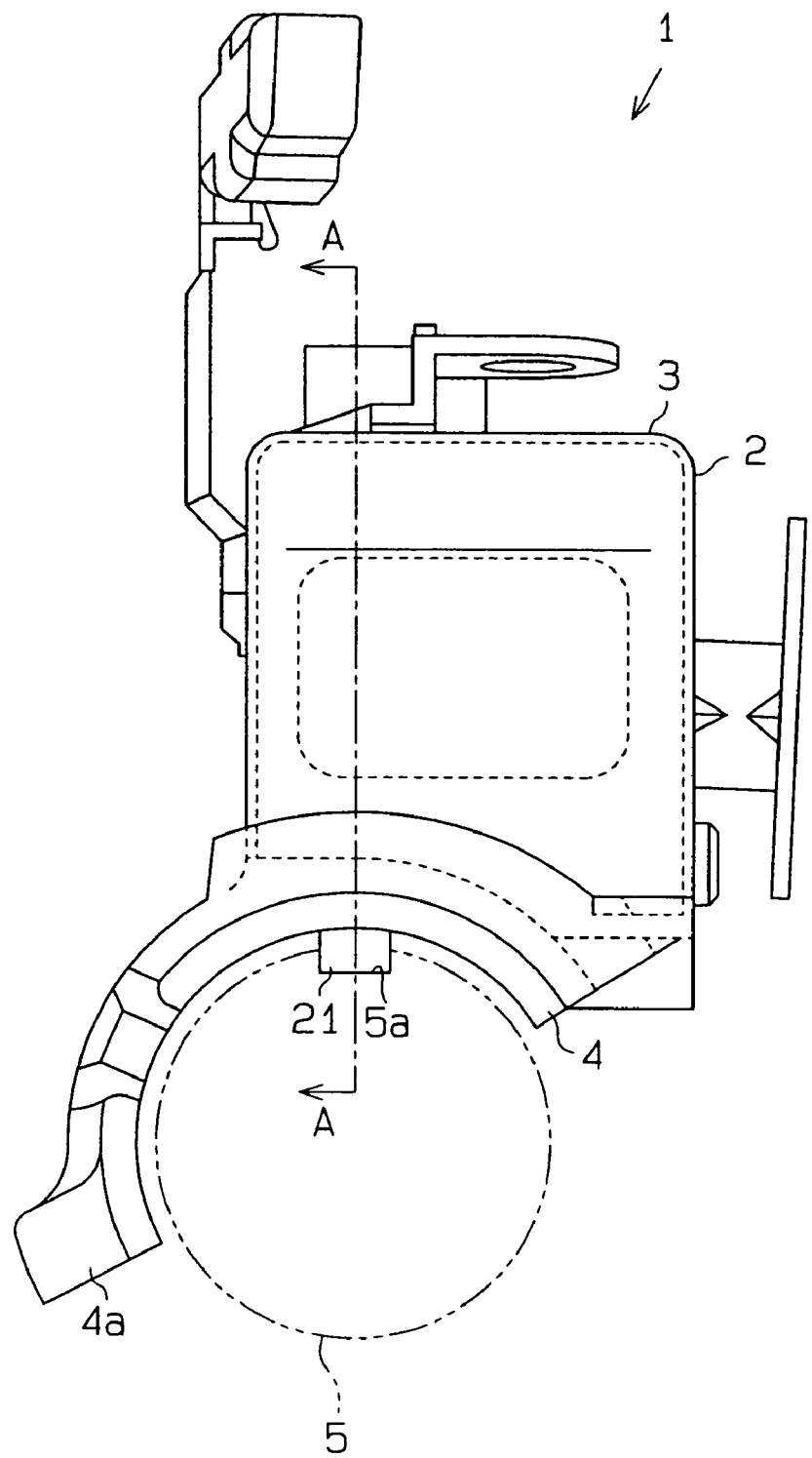
FIG. 1 is a side view showing an electronic steering wheel lock apparatus according to a first embodiment of the present invention.
Figure 2:
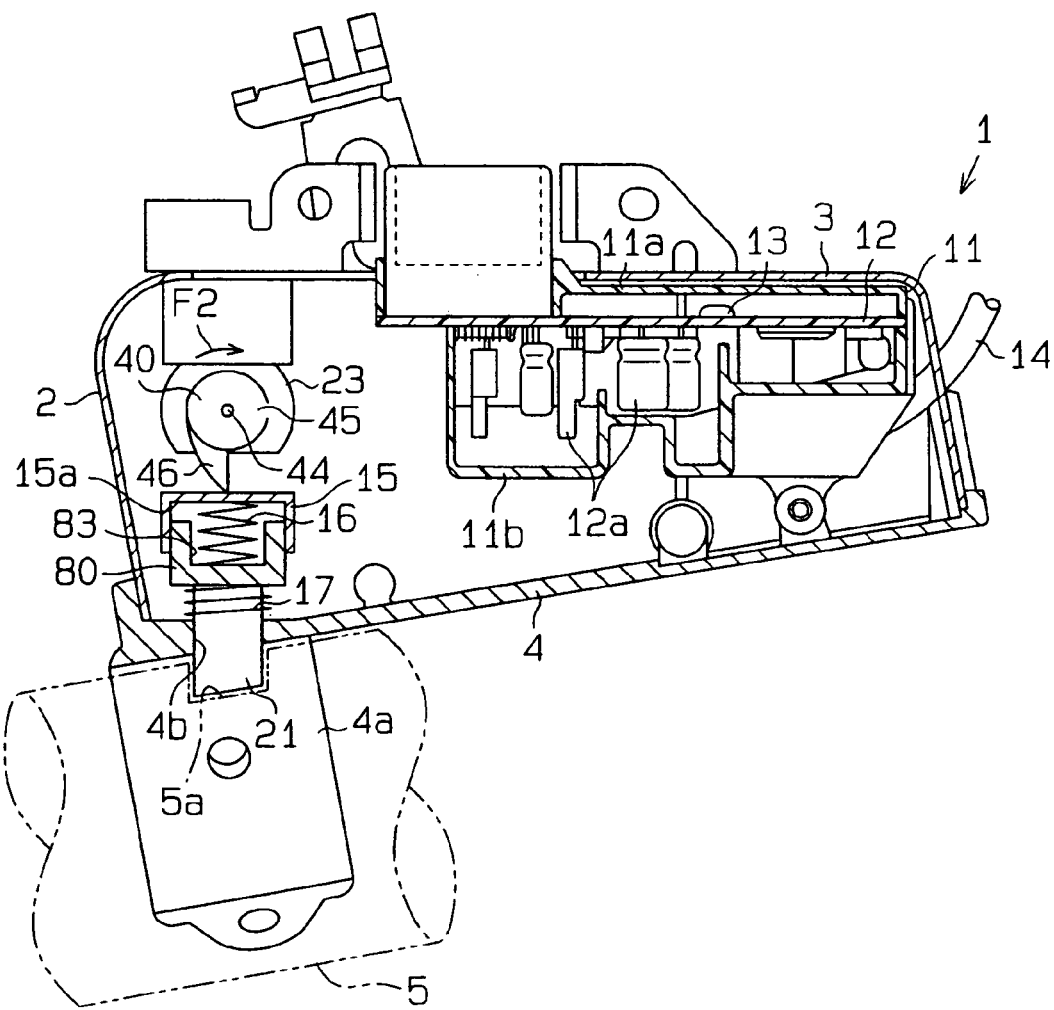
FIG. 2 is a cross-sectional view taken along line A—A in FIG. 1.

As shown in FIGS. 1 and 2, a steering wheel lock apparatus 1 is connected to a vehicle steering post (not shown in the drawings). A case body 2 of the steering wheel lock apparatus 1 is generally box-like. The case body 2 includes a cover 3 mounted on a lock body 4.

As shown in FIG. 2, a synthetic resin holding case 11 is provided on the interior side of the cover 3. The holding case 11 is formed by combining a first case 11a and a second case 11b. A printed circuit board 12 is accommodated in the holding case 11. The printed circuit board 12 is fixed to the second casing 11b by a screw 13. A plurality of electrical components, such as an IC, capacitors and the like, are mounted at a plurality of locations on the printed circuit board 12. The printed circuit board 12 is electrically connected to a wire 14 drawn to the outside of the case body 2.

As shown in FIG. 1, a generally arcuate coupling portion 4a is formed on the left end of the lock body 4. The coupling portion 4a is mounted on a column tube by a bolt (not shown). A movable component, or the steering shaft 5, that is part of the vehicle steering mechanism is inserted in the column tube. A socket 5a is provided on the exterior surface of the steering shaft 5. As shown in FIG. 2, a guide hole 4b having a generally rectangular cross section is provided in the lock body 4. The guide hole 4b is arranged in correspondence with the coupling portion 4a. The guide hole 4b communicates with the interior of the column tube when the case body 2 is mounted on the column tube.

As shown in FIG. 2, a lock pin 21, or a locking means, is arranged in the guide hole 4b so as to be movable along the guide hole 4b. The lock pin 21 is a generally rectangular cylinder. When the lock pin 21 extends from the exterior surface of the lock body 4, the distal end of the lock pin 21 engages the socket 5a.

A spring pressing member 80 having a first hollow receiving portion 83 is provided on the basal end of the lock pin 21. A lock pin spring 17 is disposed between the lock body 4 and the spring pressing member 80. The lock pin spring 17 exerts a force in a direction to draw back the lock pin 21. In other words, the lock pin spring 17 exerts a force in a direction disengaging the lock pin 21 from the socket 5a.

A cam follower 15 is mounted on the spring pressing member 80 so as to cover the first hollow receiving portion 83. The cam follower 15 has a second hollow receiving portion 15a opposing the first hollow receiving portion 83. A cam spring 16 is accommodated between the first hollow receiving portion 83 and the second hollow receiving portion 15a. The cam spring 16 urges the lock pin 21 in a direction engaging the socket 5a. The spring coefficient of the cam spring 16 is greater than the spring coefficient of the lock pin spring 17.

As shown in FIG. 2, an actuator, or a motor 23, is accommodated in the case body 2. A cam plate 40 is fixed to a rotating shaft 44 of the motor 23. The cam plate 40 rotates with the rotating shaft 44. The cam plate 40 has a cam projection 46 and a cam disk 45. The cam projection 46 protrudes from the cam disk 45 in the radial direction. The cam disk 45 is generally circular. The rotating shaft 44 extends through the center of the cam disk 45. The cam plate 40 presses the cam follower 15. The cam plate 40 rotates about the center of the rotating shaft 44 only in a clockwise direction as indicated by arrow F2 when the motor 23 is rotated. Therefore, when the cam projection 46 is not pressing the cam follower 15, the distal end of the lock pin 21 is disengaged from the socket 5a by the forces of the cam spring 16 and the lock pin spring 17. On the other hand, when the cam projection 46 is pressing the cam follower 15, the lock pin 21 engages the socket 5a. Therefore, in a state in which the operation of the motor 23 is stopped, the lock pin 21 does not move even when a force is applied in a direction in which the lock pin 21 is disengaged from the socket 5a. Furthermore, in a state in which the motor 23 is stopped, movement of the lock pin 21 is restricted by the urging forces of the cam spring 16 and the lock pin spring 17 even when a force is added in the direction in which the lock pin 21 engages the socket 5a. In other words, the lock pin 21 engages the socket 5a only by driving the motor 23. Accordingly, when the motor 23 is not actuated, the engagement relationship of the lock pin 21 and the socket 5a cannot be changed. A self-holding mechanism is formed by the lock pin spring 17, spring pressing member 80, cam spring 16, cam follower 15, and cam plate 40, and this self-holding mechanism is modifiable.

The motor 23, which drives the cam plate 40, is controlled by a control circuit, or an actuator ECU 31. As shown in FIG. 3, a verification ECU 37 is connected to the actuator ECU 31. The verification ECU 37 performs mutual communication with a portable device 37a, which is possessed by an authorized owner of the vehicle (user), and compares an ID code set in the portable device with an ID code set in the verification ECU 37. The verification ECU 37 permits the engine to start when the ID codes of the portable device 37a and the ECU 37 match, and prohibits the engine from starting when the ID codes do not match.

When the ID codes match, the verification ECU 37 outputs a drive request signal including a lock release code to the actuator ECU 31. When the ID codes do not match, the verification ECU 37 outputs a drive request signal including a lock code to the actuator ECU 31. It is desirable that the drive request signal be encoded.

The actuator ECU 31 includes a microcomputer 32. The microcomputer 32 is connected to the verification ECU 37 through a pair of diodes D1 and D2. Specifically, the cathode terminal of the diode D1 and the anode terminal of the diode D2 are connected to the microcomputer 32, and the anode terminal of the diode D1 and the cathode terminal of the diode D2 are connected to the verification ECU 37. The drive request signal of the verification ECU 37 is input to the computer 32 through the diode D1. The computer 32 outputs an activation signal to an FET 62 in accordance with the drive request signal.

Figure 3:
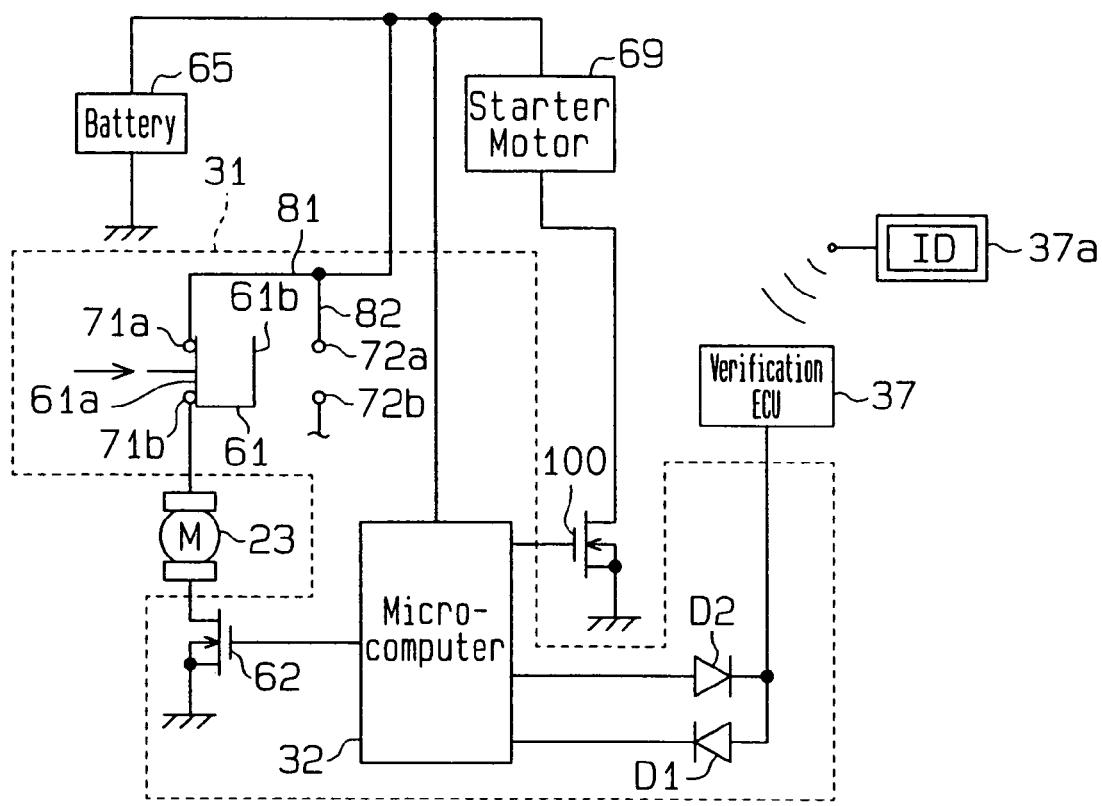
FIG. 3 is a block diagram of electric circuits in the electronic steering wheel lock apparatus of FIG. 1.

As shown in FIG. 3, the computer 32 and a starter motor 69, which starts an engine, are electrically connected to a battery 65. The starter motor 69 is connected to the drain terminal of a field-effect transistor (FET) 100. The gate terminal of the FET 100 is connected to the computer 32, and the source terminal of the FET 100 is grounded.

The battery 65 is connected to the motor 23 through a first power supply line, or a motor power supply line 81. The motor power supply line 81 includes a first contact pair 71a and 71b. The motor 23 is electrically connected to the drain terminal of an FET 62. The gate terminal of the FET 62 is connected to the computer 32, and the source terminal of the FET 62 is grounded. The FET 62 goes ON when a drive signal is output from the computer 32. When the FET 62 goes ON and the first contact pair 71a and 72b are connected, current for operating the motor 23 flows to the motor power supply line 81. This rotates the rotating shaft 44 of the motor 23 in the arrow F2 direction.

The battery 65 is connected to electrical devices, such as an electronic fuel injection control device and other electrical components, which are not shown in the drawing, through a second power supply line, or an ignition power supply line 82. The ignition power supply line 82 includes a second contact pair 72a and 72b. When the second contact pair 72a and 72b are connected, power flows to the electrical devices.

A transmission signal is transmitted from the portable device 37a carried by a user. The verification ECU 37 compares the ID code included in the transmission signal with an ID code prestored in the verification ECU 37. When both ID codes match, the verification ECU 37 outputs a release signal. The computer 32 outputs an activation signal to the FET 62 in accordance with the release signal, activates the FET 62, and unlocks the steering wheel.

A switching circuit including a switch 61 is arranged between the battery 65 and the motor 23. The switch 61 has first and second movable contacts 61a and 61b. The switch 61a is manually operated between a position at which the first movable contact 61a contacts a first contact pair 71a and 71b and a position at which the first movable contact 61a contacts a second contact pair 72a and 72b. When the first movable contact 61a contacts the first contact pair 71a and 71b, the first contact pair 71a and 71b are connected, and power is supplied to the motor 23.

When the vehicle is being driven, the first movable contact 61a is separated from the first contact pair 71a and 71b, and the switch 61 mechanically breaks the motor power supply line 81. Thus, the motor 23 does not operate. That is, the first movable contact 61a mechanically switches the motor power supply line 81 to a disconnected state in cooperation with the switch 61. Further, the second movable contact 61b contacts the second contact pair 72a and 72b. This supplies the electronic fuel injection control device and other electrical components with power through the ignition power supply line 82.

In the following description, the phrase "when a vehicle is being driven" is a state satisfying at least one of the conditions in which a shift lever is not at a parking position, an engine is running, a functional position is in an "ON" position, and starting of the engine is enabled. In addition, the phrase "starting of the engine is enabled" refers to, for example, when an ID code registered in a portable device, which is possessed by a user, coincides with an ID code, which is registered in the vehicle, and when an authorized mechanical key is inserted in a key cylinder of the vehicle.

The operation of the steering wheel lock apparatus 1 is described hereinafter.

First, in the state shown in FIG. 2, when the verification ECU 37 receives a transmission signal from the portable device 37a, the verification ECU 37 compares the ID code of the portable device 37a included in the transmission signal with the ID code recorded in the ECU 37. When both ID codes match, the verification ECU 37 provides a release signal to the computer 32. The computer 32 provides an activation signal to the FET 62 to turn ON the FET 62 in response to the release signal. When the FET is turned ON, the cam plate 40 is rotated in the arrow F2 direction, and the engagement of the lock pin 21 and the socket 5a is released. Thin enables rotation of the steering shaft 5 and the steering wheel.

When starting the engine, the user operates the switch 61. The starting operation separates the first movable contact 61a from the first contact pair 71a and 71b and causes the second movable contact 61b to contact the second contact pair 72a and 72b. This breaks the motor power supply line 81 and connects the ignition power supply line 82. In this state, the starter motor 69 is actuated to start the engine.

If electrical noise is produced when starting the engine, the computer 32 may erroneously output an activation signal to the FET 62 and turn ON the FET 62. However, since the switch 61 breaks the motor power supply line 81, the motor 23 is not actuated. Thus, erroneous engagement of the lock pin 21 with the socket 5a is prevented.

The user operates the switch 61 to stop the engine. Then, the first movable contact 61a contacts the first contact pair 71a and 71b. In this state, the computer 32 provides the activation signal to the FET 62 and turns ON the FET 62. The actuation of the motor 23 rotates the cam plate 40 in the arrow F2 direction of the motor 23 and engages the lock pin 21 with the socket 5a. As a result, the steering shaft 5 and a steering wheel, which is not shown in the drawing, are locked.

The first embodiment has the following advantages.

(1) When the vehicle is being driven, the switch 61 opens the motor power supply line 81 and prohibits the actuation of the motor 23. Thus, current does not flow to the motor power supply line 81 even if an activation signal is output from the computer 32 to the actuator ECU 31 due to electrical noise. For this reason, erroneous engagement of the lock pin 21 with the steering shaft 5 that would be caused by erroneous operation of the motor 23 is prevented. This improves the reliability of the steering wheel lock apparatus 1.

(2) When the switch 61 closes the ignition power supply line 82, the switch 61 mechanically opens the motor power supply line 81. This simplifies the structure of the steering wheel lock apparatus 1.

(3) The switch 61 is provided upstream of the motor 23, i.e., between the motor 23 and the battery 65, in the motor power supply line 81. For this reason, current does not flow to the motor 23 even when the FET 62 is switched ON by electrical noise. Thus, erroneous operation of the steering wheel lock apparatus 1 is reliably prevented.

(4) The mechanical breaking of the motor power supply line 81 and the mechanical connecting of the ignition power supply line 82 are performed simultaneously by operating the switch 61. Therefore, there is no need to provide separate mechanisms for mechanically breaking the motor power supply line 81 and for mechanically connecting the ignition power supply line 82. Accordingly, the operations required when starting the engine are simplified. Furthermore, the cost of manufacturing the steering wheel lock apparatus 1 is reduced since a mechanism for mechanically connecting the ignition power supply line 82 is omitted.

(Second Embodiment)

A steering wheel lock apparatus 1 according to a second embodiment of the present invention is described hereinafter with reference to FIG. 4A. Each of the following embodiments is mainly described in terms of differences relative to the first embodiment.

Figure 4A:
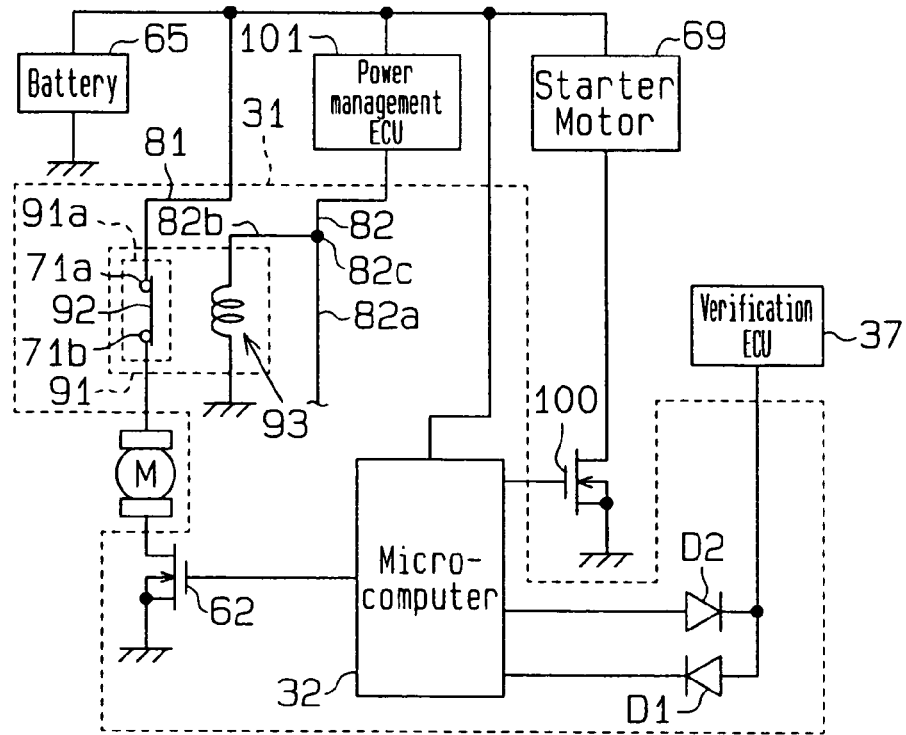
FIG. 4A is a block diagram of electric circuits in an electronic steering wheel lock apparatus according to a second embodiment of the present invention.

As shown in FIG. 4A, the ignition power supply line 82 is divided into a first branch line 82a and a second branch line 82b at node 82c. Current flows through the first branch line 82a to power an electronic fuel injection control device and other electrical components.

As further shown in FIG. 4A, in the second embodiment, a switching circuit including a relay 91 is used in place of the switch 61 of FIG. 3. The relay 91 has a contact 91a and a coil 93, which functions as an attraction element. The contact 91a is connected to the motor power supply line 81, and the coil 93 is connected to the second branch line 82b. The contact 91a is formed by a first contact pair 71a and 71b and a movable terminal 92. More specifically, the contact 91a is a B contact (normal closed) with one of its terminals being connected to the battery 65 and the other one of its terminals being connected to the motor 23. One terminal of the coil 93 is connected to a power management ECU 101, and the other terminal is grounded. The power management ECU 101 controls the electrical connections of the electronic fuel injection control device and other electrical components with the battery 65. When the power management ECU 101 outputs an activation signal, the ignition power supply line 82 is connected, the coil 93 attracts the movable terminal 92 to open the contact 91a, and the motor power supply line 81 is broken. That is, when the function position of the vehicle is "ON", the relay 91 breaks the motor power supply line 81.

Figure 4B:
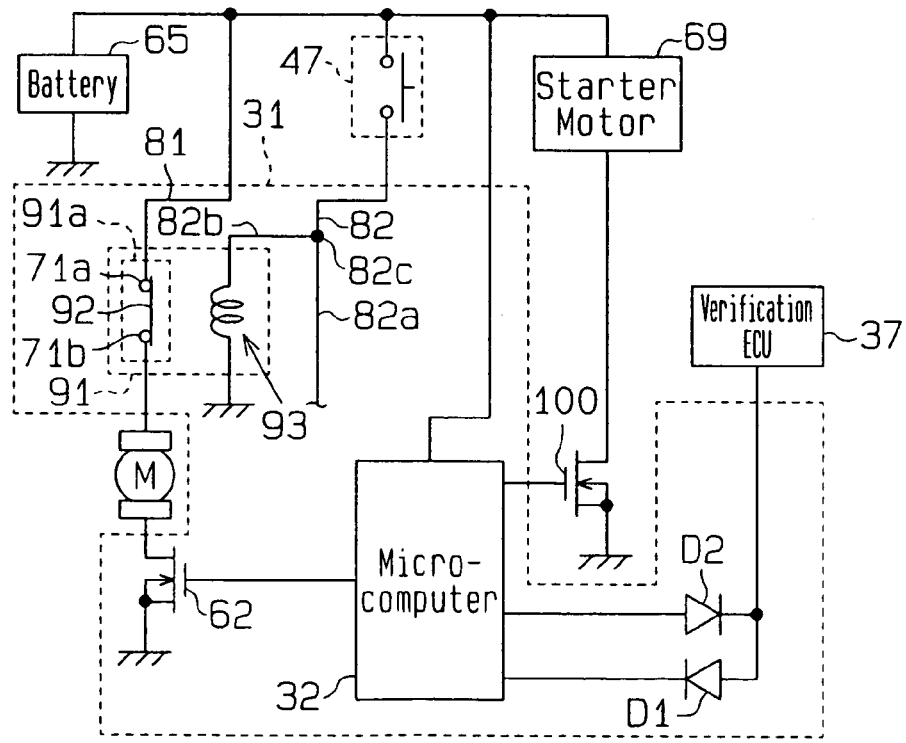
FIG. 4B is a block diagram showing a modified example of FIG. 4A.

FIG. 4B shows a modified example of FIG. 4A. Specifically, in FIG. 4B, the power management ECU 101 of FIG.

4A is changed to an ignition switch 47. The ignition switch 47 is desirably a contact holding type switch. The ignition switch 47 is connected between the coil 93 and the battery 65. When the ignition switch 47 is closed, current flows to the ignition power supply line 82, the contact 91a is opened, and the motor power supply line 81 is broken. When the engine is running and the vehicle is being driven, erroneous operation of the steering wheel lock apparatus 1 is reliably prevented since the ignition power oath 82 is closed and the motor power supply line 81 is broken. In FIG. 4B, the relay 91 is switched between ON and OFF by the ignition switch 47.

The ignition switch 47 includes functions for starting and stopping the engine in addition to shifting the function position of the vehicle to the "ON" state.

In FIGS. 4A and 4B, the phrase "function position of the vehicle in an ON state" is a state in which electricity is supplied to the electronic fuel injection control device and other electrical components. Furthermore, the switching circuit is not limited to the contact type switching device, such as the relay 91, and may be a non-contact switch, such as the FET 62 or a power transistor.

The second embodiment has the following advantages.

(5) When the power management ECU 101 outputs an activation signal, the ignition power supply line 82 is in a connected state. In this state, the coil 93 attracts the movable terminal 92, and the first contact pair 71a and 71b are opened. As a result, the disconnection of the motor power supply line 81 stops the flow of current to the motor 23. Therefore, only one of the motor power supply line 81 and the ignition power supply line 82 is normally in a connected state. Accordingly, the steering wheel lock apparatus 1 has even greater reliability.

(6) The ignition power supply line 82 is formed by the first branch line 82a and the second branch line 82b, and the relay 91 is connected to the second branch line 82b. Therefore, the relay 91 may be separated from the electrical components (e.g., electronic fuel injection control device) connected to the first branch line 82a. Accordingly, there is freedom for the arrangement of the relay 91.

(Third Embodiment)

The steering wheel lock apparatus 1 according to a third embodiment of the present invention is described hereinafter with reference to FIGS. 5 and 6.

Figure 5:
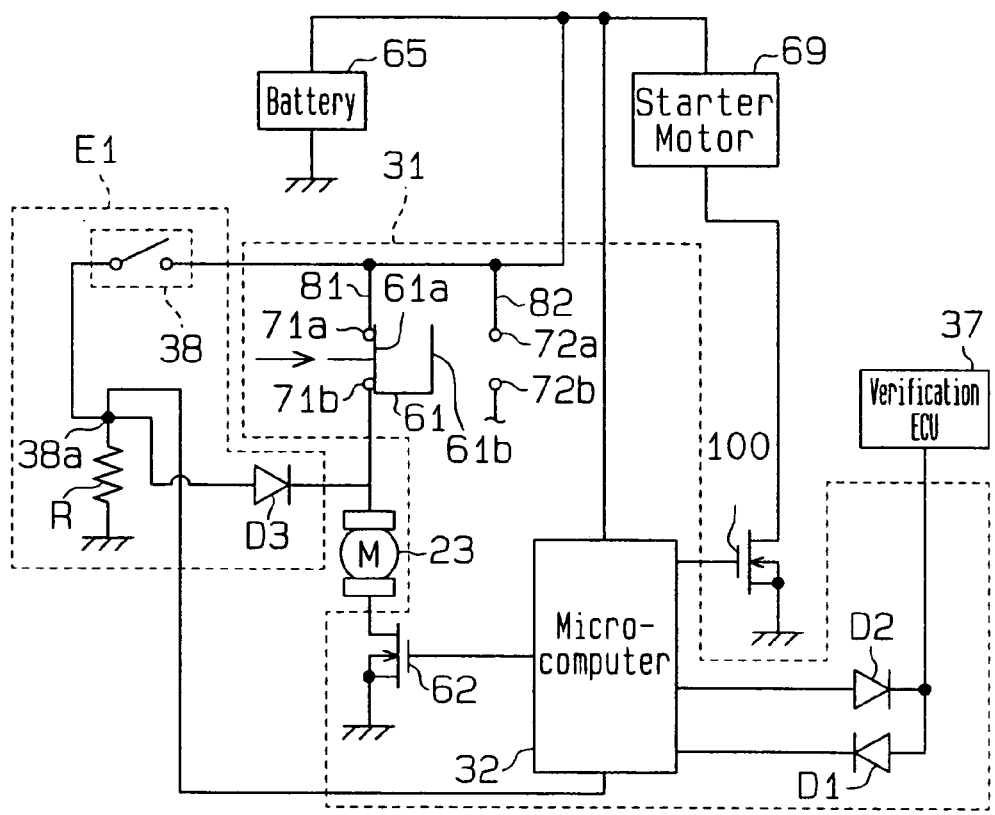
FIG. 5 is a block diagram of electric circuits in an electronic steering wheel lock apparatus according to a third embodiment of the present invention.

The point differing from the first embodiment is in that a lock position detection switch 38, resistor R, and a diode D3 are connected to the actuator ECU 31, as shown in FIG. 5.

Figure 6A:
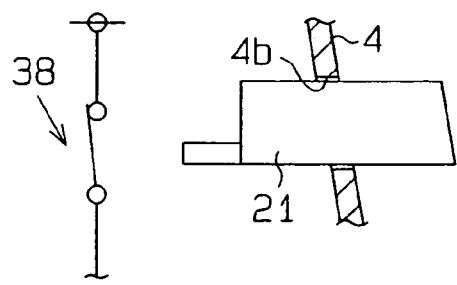
FIGS. 6A and 6B are schematic diagrams illustrating a locking part and a lock position detection switch of a locking device shown in FIG. 5.
Figure 6B:
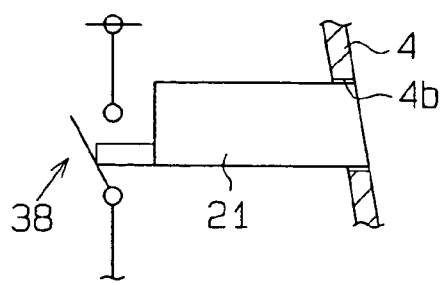

As shown in FIG. 6, the lock position detection switch 38 is a normal-closed type mechanical switch arranged at the basal end of the lock pin 21 and is desirably a limit switch. The lock position detection switch 38 is closed when the lock pin 21 protrudes from the guide hole 4b of the lock body 4, as shown in FIG. 6A. The lock position detection switch 38 is opened when the lock pin 21 is accommodated within the lock body 4. That is, the lock position detection switch 38 is closed when the lock pin 21 engages the socket 5a of the steering shaft 5 and is opened when the engagement with the socket 5a is released.

As shown in FIG. 5, the lock position detection switch 38 is connected between the positive terminal of the battery 65 and a node 38a between the anode terminal of a diode D3 and a resistor R. The resistor R is grounded, and the cathode terminal of the diode D3 is connected to an electric line connecting the first contact 71b and the motor 23. That is, the lock position detection switch 38 is connected in parallel with the switch 61. For this reason, power is supplied to the actuator ECU 31 only when at least one of the switch 61 and the lock position detection switch 38 is closed.

Accordingly, power is supplied to the actuator ECU 31 and the motor 23 continues to operate until the lock position detection switch 38 is opened even when the switch 61 is opened before the lock pin 21 is disengaged from the socket 5a. That is, the motor 23 continues to operate until the lock disengagement is completed even when the shift position is shifted to a position other than parking during lock disengagement. Then, the operation of the motor 23 is stopped when the lock disengagement is completed since the supply of power to the motor 23 is stopped at the moment the lock disengagement is completed.

The computer 32 is connected to the node 38a, and the potential at the node 38a is input to the computer 32. The potential at the node 38a is high when the lock position detection switch 38 is closed and low when the switch 38 is opened. Thus, the computer 32 detects the opened or closed state of the lock position detection switch 38 from the potential at the node 38a. The computer 32 stops the output of the control signal to the FET 62 when there has been a change in the detected potential at the node 38a. Specifically, the computer 32 stops the output of the control signal to the FET 62 when the engagement of the lock pin 21 and the socket 5a has been completed. Further, the computer 32 stops the output of the control signal to the FET 62 when the lock pin 21 is disengaged from the socket 5a. That is, the computer 32 stops the operation of the motor 23 when the opened or closed state of the lock position detection switch 38 changes. The computer 32 outputs the detection result to the verification ECU 37 through a diode D2. In this way, the verification ECU 37 recognizes the engagement state of the lock pin 21 and the socket 5a.

The third embodiment has the following advantages.

(7) The motor 23 continues to operate until the lock pin 21 is disengaged from the socket 5a of the steering shaft 5 even when the switch 61 is opened. Therefore, rotation of the steering shaft 5 is prohibited even when the switch 61 is opened before the lock pin 21 is disengaged from the socket 5a. That is, the lock pin 21 is reliably released from the socket 5a.

When the lock pin 21 is disengaged from the socket 5a, the supply of power to the motor 23 is stopped. Therefore, the motor 23 cannot be operated by the control signal even when a control signal is output from the computer 32 to the FET 62 due to noise or the like.

(8) The computer 32 stops the operation of the motor 23 when there is a change in the operating state of the lock position detection switch 38. That is, the computer 32 feedback controls the operation of the motor 23. For this reason, the motor 23 does not continue to operate when the engagement or disengagement of the lock pin 21 and the socket 5a is completed. For this reason, the motor 23 does not continue to operate when the engagement or disengagement of the lock pin 21 and the socket 5a is completed. Thus, the load on the motor 23 is reduced, and the life of the motor 23 is prolonged.

(Fourth Embodiment)

A steering wheel lock apparatus 1 according to a fourth embodiment of the present invention is described hereinafter with reference to FIGS. 7 and 8.

The steering wheel lock apparatus 1 of the fourth embodiment has an electrical switching device 41, which is operated in accordance with an ignition signal, in place of the switch 61 of FIG. 3. The ignition signal is generated by a detection circuit, which is not shown in the drawings, when the engine is being driven.

Figure 7:
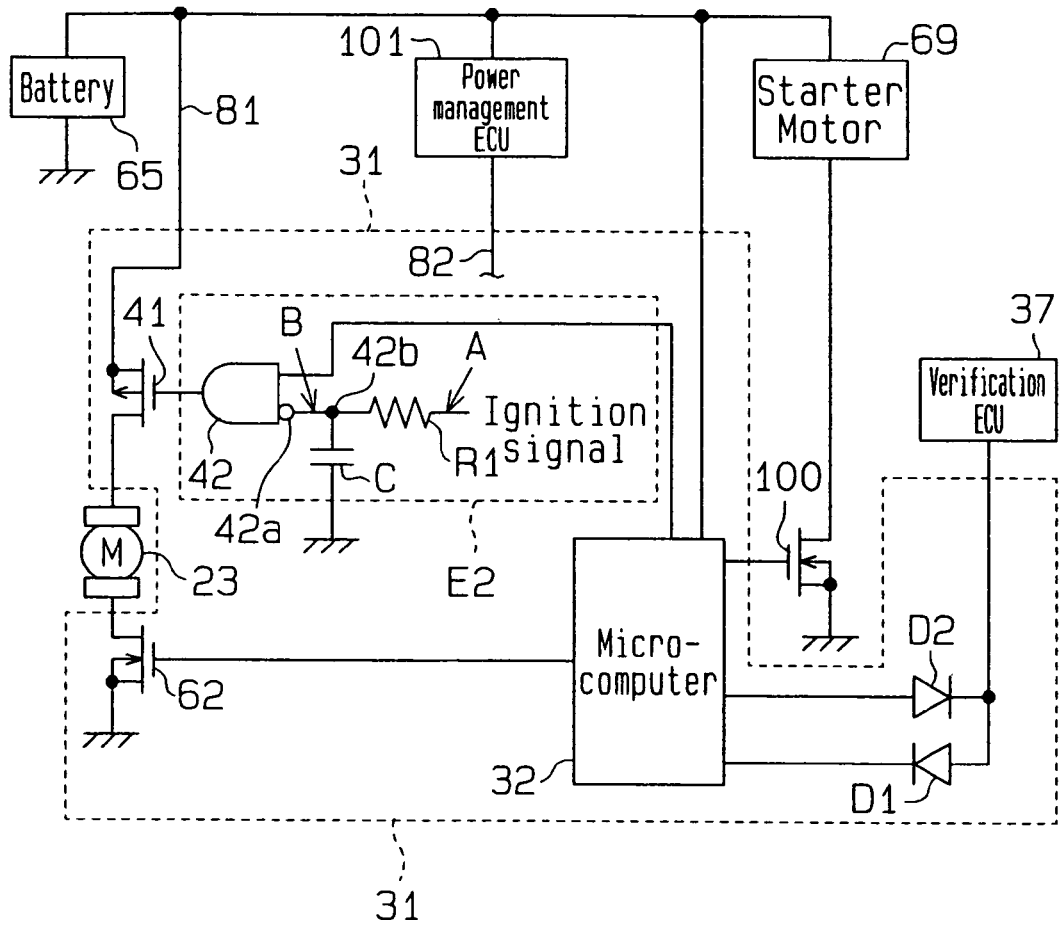
FIG. 7 is a block diagram of an electric circuit of an electronic steering wheel lock apparatus according to a fourth embodiment of the present invention.

Specifically, as shown in FIG. 7, an electrical switching device, or an n-channel power MOSFET (FET) 41, is connected to the motor power supply line 81. The source terminal of the FET 41 is connected to the battery 65, and the drain terminal is connected to the motor 23. A switch drive circuit E2 is connected to the gate terminal of the FET 41. The switch drive circuit E2 has a resistor R1, a capacitor C, an inverter 42a, and an AND circuit 42.

The capacitor C and the resistor R1 are connected at a node 42b. The resistor R1 is connected to a detection circuit installed in an engine, which is not shown in the drawings, and receives an ignition signal from the detection circuit. One terminal of the capacitor C is grounded. The output terminal of the AND circuit 42 is connected to the gate terminal of the FET 41. For this reason, when a high signal (drive permission signal) from the computer 32 and a low ignition signal is input, the AND circuit 42 outputs a high signal (activation signal). Thus, the FET 41 is activated when a high signal (activation signal) is output from the AND circuit 42. That is, when the high drive permission signal from the computer 32 is input and the low ignition signal from the detection circuit is input, the switch drive circuit E2 activates the FET 41 and connects the motor power supply line 81.

Figure 8:
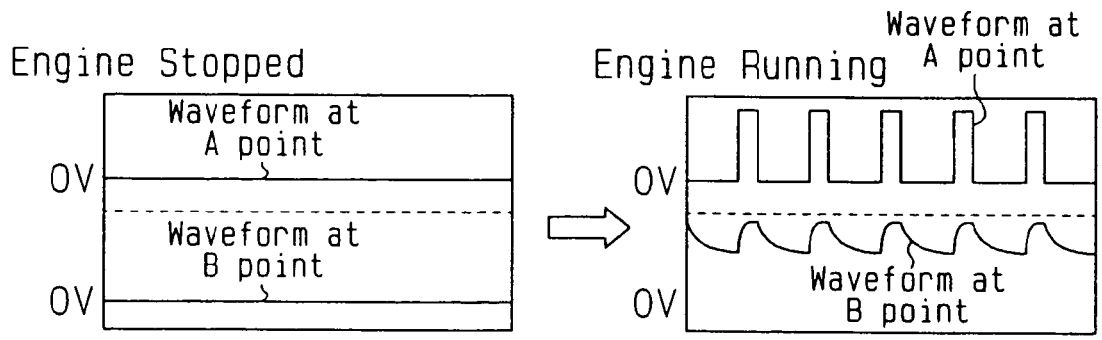
FIG. 8 is a waveform diagram showing the waveform of an ignition signal for controlling the operation of a switching circuit of the lock apparatus of FIG. 7.

At the location indicated by the arrow A in FIG. 7, the ignition signal has a low and flat waveform when the engine is stopped and a pulse waveform (ignition pulse) when the engine is running, as shown in FIG. 8. Furthermore, the ignition signal during engine operation is integrated by the resistor R1 and the capacitor C at the location indicated by B in FIG. 7 to a waveform held at a high level, as shown in FIG. 8. For this reason, the AND circuit 42 outputs an activation signal only if the drive permission signal is input from the computer 32 when the engine is stopped. Thus, the FET 41 is turned ON only if the drive permission signal is output from the computer 32 when the engine is stopped. In the present embodiment, the switching device (FET 41) and the switch drive circuit E2 break the motor power supply line 81 of the control device (actuator ECU 31) when the engine is running and connects the motor power supply line 81 when the engine is stopped.

The fourth embodiment has the following advantages.

(9) The AND circuit 42 outputs the activation signal to the FET 41 only if the drive permission signal from the computer 32 is input when the engine is stopped. The AND circuit 42 outputs the activation signal to the FET 41 only if the drive permission signal from the computer 32 is input when the engine is stopped. Since the FET 41 is provided in the motor power supply line 81, the driving of the motor 23 is enabled only if a drive permission signal from the computer 32 is input when the engine is stopped. Thus, the driving of the motor 23 is prohibited even if the drive permission signal is output from the computer 32 when the vehicle is being driven and the control signal sent to the FET 62 is high. Thus, even though the switching device is formed by electric elements, the same reliability as when the switching device is formed from mechanical elements is obtained. For this reason, erroneous operation of the steering wheel lock apparatus 1 caused by noise and the like is reliably prevented.

(10) The AND circuit 42 uses an ignition signal to detect the operating state of the engine. Therefore, the driving state of the engine is reliably detected, and erroneous driving of the motor 23 is reliably prevented when the engine is running.

(Fifth Embodiment)

The steering wheel lock apparatus 1 according to a fifth embodiment of the present invention is described hereinafter with reference to FIG. 9A.

The steering wheel lock apparatus 1 of the fifth embodiment has an electrical switching device (FET) 41, which is operated in accordance with an output signal from a verification ECU 37 and an output signal from an engine ECU 48, in place of the switch 61.

Figure 9A:
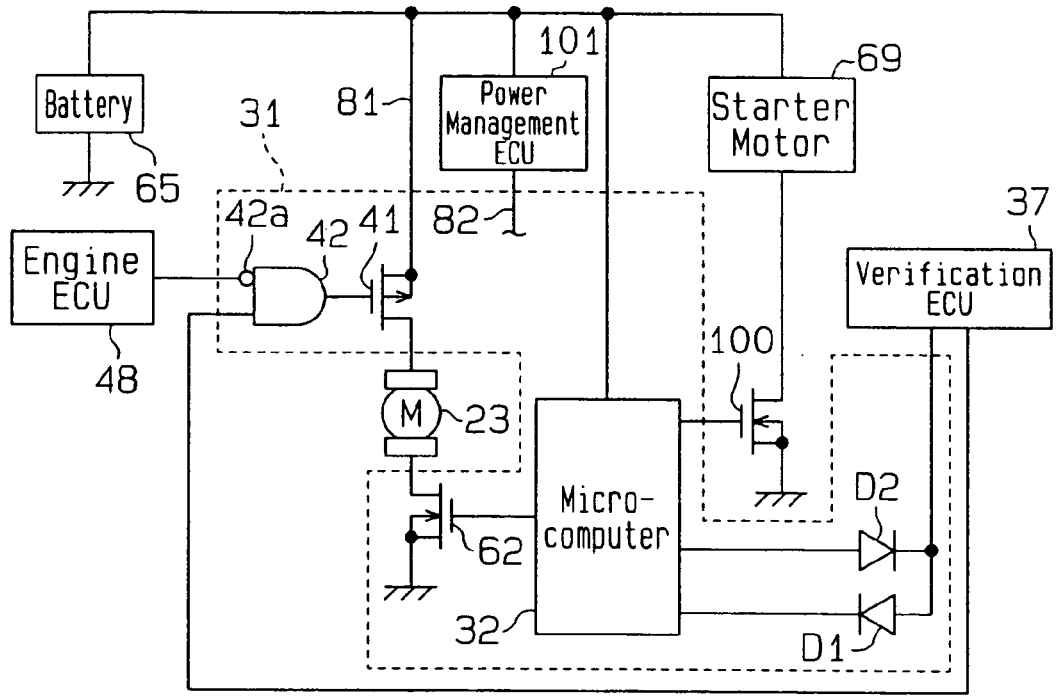
FIG. 9A is a block diagram of electric circuits in an electronic steering wheel lock apparatus according to a fifth embodiment of the present invention.

Specifically, an AND circuit 42 is connected to the gate terminal of an FET 41, as shown in FIG. 9A. One input terminal of the AND circuit 42 is connected to the verification ECU 37, and the other input terminal is connected to the engine ECU 48 by an inverter 42a. Thus, in this case, a switching circuit is configured by the FET 41 and the AND circuit 42.

Figure 9B:
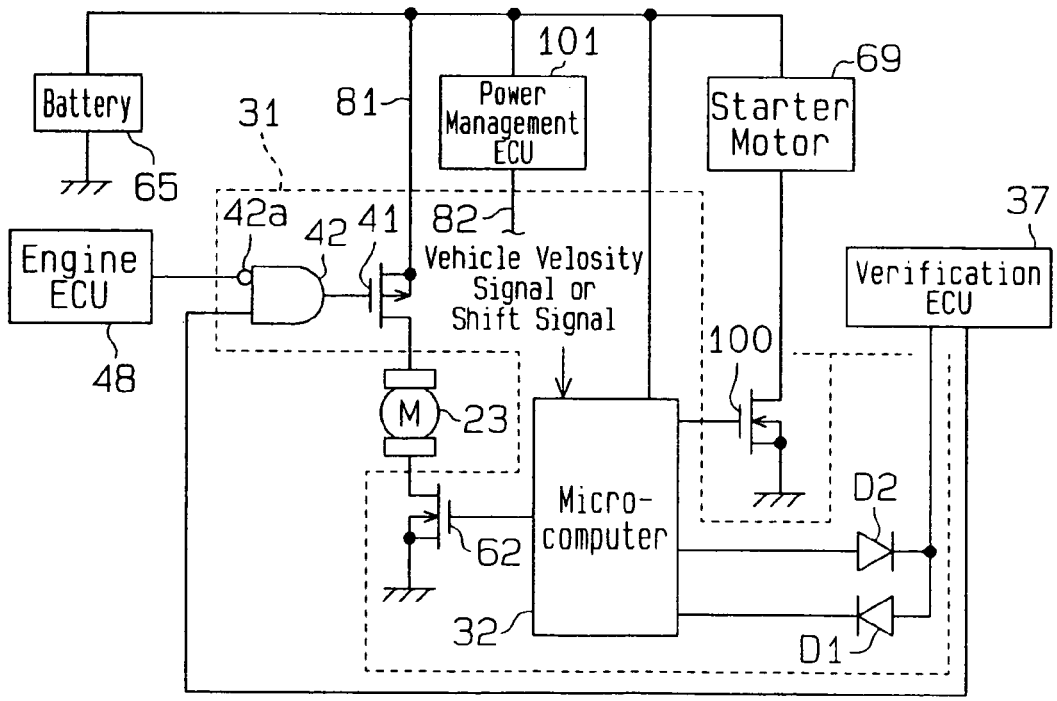
FIG. 9B is a block diagram showing a modified example of FIG. 9A.

As shown in FIG. 9B, a velocity signal, a shift signal or the like may be input to the computer 32. Then, when the speed is not null, that is, when the vehicle is being driven, or when the shift position is not in the parking position, an activation signal is not output from the computer 32 to the FET 62. In this case, even if the ECUs 37 and 48 operate erroneously and activate the FET 41, the FET 62 does not go ON. Thus, the motor 23 does not drive the lock pin 21 in a direction that it is disengaged from the socket 5a. Accordingly, when the vehicle is being driven or when the shift position is not at the parking position, the actuator ECU 31 does not operate the motor 23. Therefore, erroneous operation of the steering wheel lock apparatus 1 is reliably prevented when the vehicle is being driven.

Furthermore, although the FET 41 is activated in accordance with output signals output from the verification ECU 37 and the engine ECU 48, activation of the FET 41 may be controlled by, for example, another ECU, such as a shift ECU or the like.

The fifth embodiment provides the following advantage.

(11) The drive control of the motor 23 is performed in accordance with output signals output from separate ECUs (verification ECU 37 and engine ECU 48), and not just the activation signal output from the computer 32. Therefore, erroneous operation of the steering wheel lock apparatus 1 does not occur unless all ECUs 31, 37, and 48 function erroneously. Thus, erroneous operation of the steering wheel lock apparatus 1 is prevented.

(Sixth Embodiment)

A steering wheel lock apparatus 1 according to a sixth embodiment of the present invention is described hereinafter with reference to FIG. 10.

Figure 10:
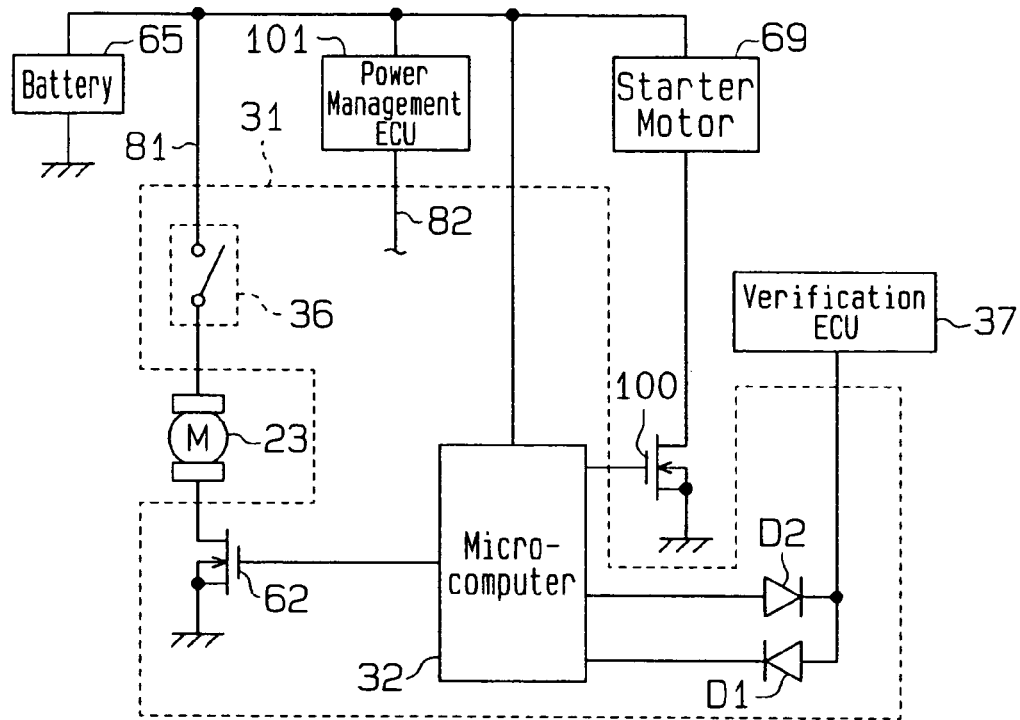
FIG. 10 is a block diagram of electric circuits in an electronic steering wheel lock apparatus according to a sixth embodiment of the present invention.

The steering wheel lock apparatus 1 of the sixth embodiment has a shift cooperation switch 36 in place of the switch 61, as shown in FIG. 10. The shift cooperation switch 36 mechanically breaks a motor power supply line 81 except when the shift lever is in the parking position.

The "shift cooperation switch 36" is located near a shift lever, which is not shown in the drawing, and is a switch opened and closed in cooperation with the movement of the shift lever. The shift cooperation switch 36 is closed when the shift lever is at the parking position and opened when the shift lever is located at other positions. The shift cooperation switch 36 is desirably a contact-type switch, which opens and closes a contact in accordance with the shift position, such as a limit switch, a reed switch, or the like. Furthermore, the phrase "in the parking position" refers to a state satisfying at least one of the conditions in which the shift lever is at the P position, and a transmission gear parking lock is functioning.

A parking brake cooperation switch, which is closed only when, for example, the parking brake is operating, also may be used in place of the shift cooperation switch 36. Furthermore, the shift cooperation switch 36 and the parking brake cooperation switch may be used together with the switched connected in series.

The sixth embodiment has the following advantage.

(12) The shift cooperation switch 36 is provided in the motor power supply line 81 and operation is enabled only when the shift position is at the parking position and the activation signal is output from the computer 32 to the FET 62. Thus, the driving of the motor 23 is prohibited even if the activation signal is output from the computer 32 to the FET 62 when the vehicle is being driven. Thus, erroneous operation of the steering wheel lock apparatus 1 due to noise or the like is reliably prevented.

Each of the embodiments may be modified as described below.

In the first embodiment, the flow of current to the motor power supply line 81 is mechanically broken by operating the switch 61. However, the flow of current to the motor power supply line 81 may be mechanically broken by inserting a key plate to directly operate the movable contacts 61a and 61b with the distal end of the key plate.

In the first embodiment, the FET 62 may be provided on the upstream side of the motor 23 in the motor power supply line 81, and the switch 61 may be provided on the downstream side of the motor 23 in the motor power supply line 81.

In the fourth embodiment, the lock position detection switch 38, the resistor R, and the diode D3 (electric circuit E1 shown in FIG. 5) may be connected to the actuator ECU 31 in the same manner as in the third embodiment. In this case, the motor 23 is not driven continuously when the engagement or disengagement of the lock pin 21 and the socket 5a is completed and the same effect as advantage (8) in the third embodiment is obtained. Furthermore, the lock position detection switch 38 and diode D3 of the electric circuit E1 may also be connected to the actuator ECU 31 in the embodiments described below.

Figure 11:
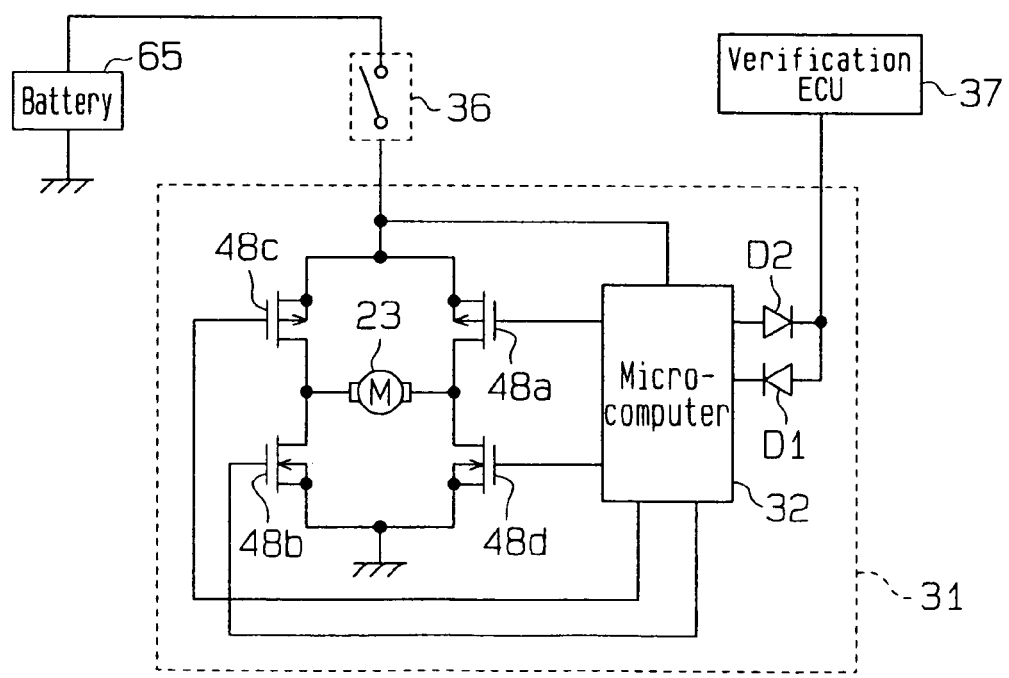
FIG. 11 is a block diagram of electric circuits in an electronic steering wheel lock apparatus according to a seventh embodiment of the present invention.

In each embodiment, the switch 61 is used as the switching device. However, a non-contact switch, such as a power transistor, a power MOSFET, or the like, may also be used as the switching device. For example, in a seventh embodiment shown in FIG. 11, a switching device is configured by a bridge circuit including four n-channel power MOSFETs 48a to 48d.

In each embodiment, the engine is started and stopped by operating an engine start/stop switch arranged in a passenger compartment. However, the engine also may be started and stopped by inserting a mechanical key into a typical key cylinder and rotating the key. For example, the switch 61 of the first embodiment may be changed to a key-cooperation switch for breaking the motor power supply line 81 when a mechanical key is inserted into a key cylinder. In this case, the lock release must be accomplished before the mechanical key is inserted into the key cylinder. As a specific example, the verification of the ID code with the verification ECU 37 is performed before the mechanical key is inserted into the key cylinder. Further, the lock position detection switch 38 of the third embodiment is connected in parallel with the key cooperation switch. In this case, the switching device is also a switching device (i.e., key cooperation switch). The switching device breaks the motor power supply line 81 when starting of the engine is enabled and connects the motor power supply line 81 when starting of the engine is enabled.

In the third embodiment, a limit switch is used as the lock position detection switch 38. However, the lock position detection switch 38 is not limited to a limit switch and any contact switch that opens and closes a contact in accordance with the position of the lock pin 21 may be used.

In the third embodiment, the opened and closed state of the lock position detection switch 38 is input to the computer 32. Then, the computer 32 stops the operation of the motor 23 when there is a change in the opened or closed state of the lock position detection switch 38 based on the input signal. However, the input of the opened or closed state of the lock position detection switch 38 to the computer 32 may be omitted.

In the fourth embodiment, the FET 41 is activated in accordance with the ignition signal. However, the FET 41 also may be activated in accordance with a signal from which the driving state of the engine is detectable, for example, vehicle velocity, alternator output, or the like.

Figure 12:
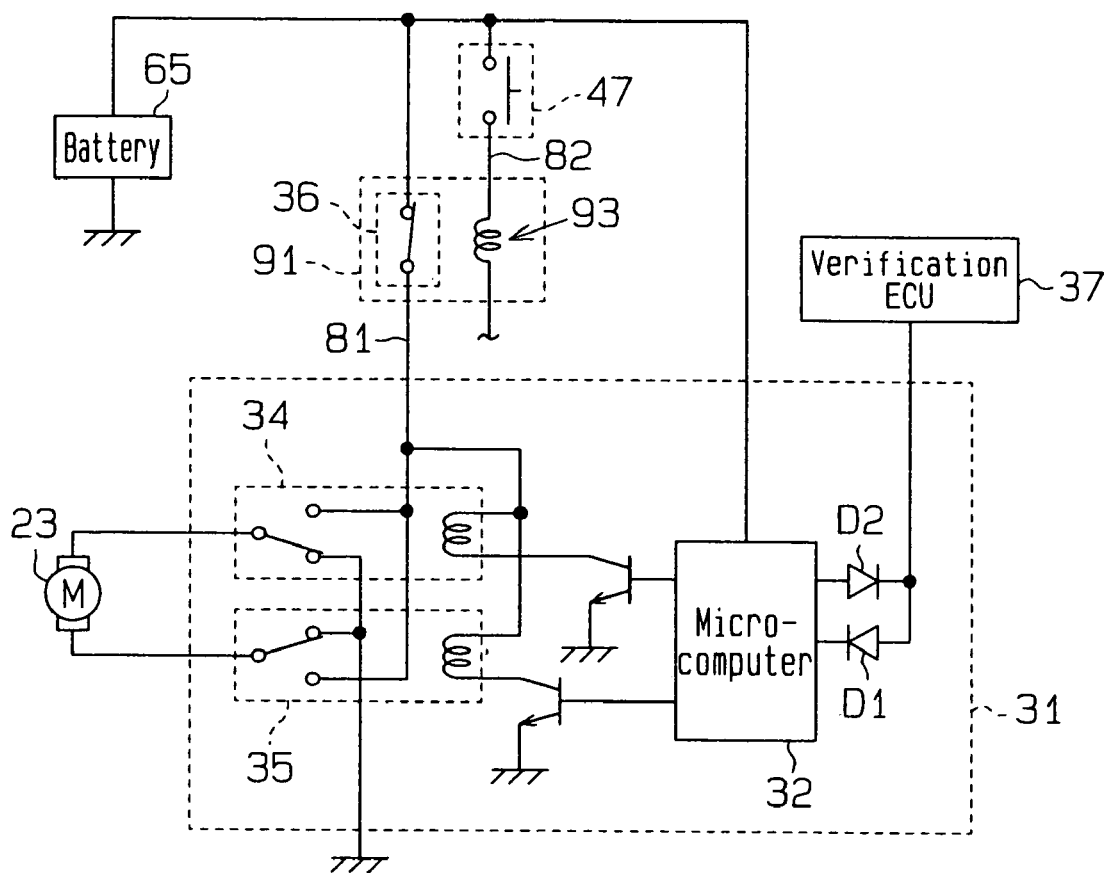
FIG. 12 is a block diagram of electric circuits in an electronic steering wheel lock apparatus according to an eighth embodiment of the present invention.
Figure 13:
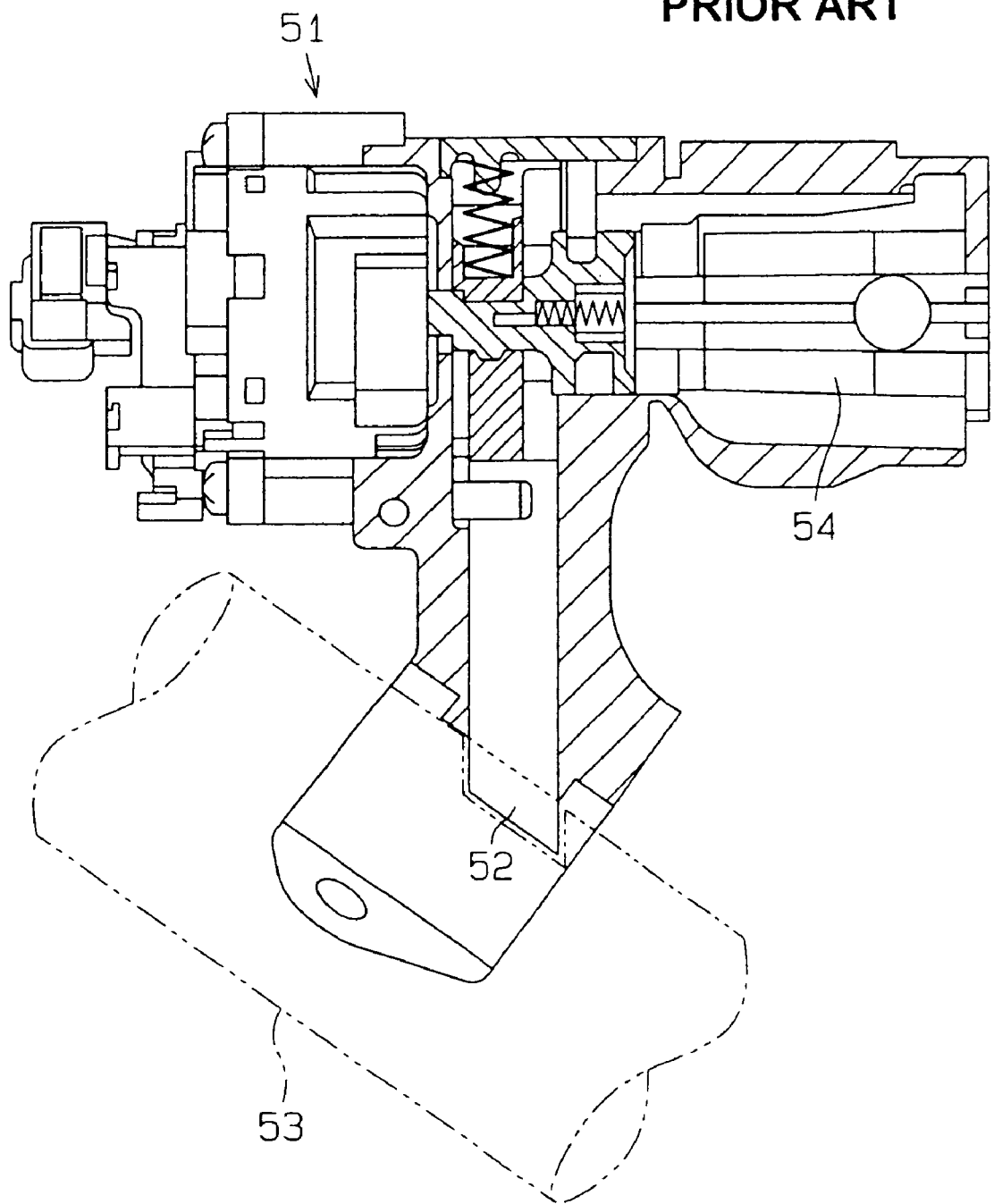
FIG. 13 is a cross-sectional view of a steering wheel lock apparatus in the prior art.

In each of the embodiments, the motor 23 rotates only in the arrow F2 direction shown in FIG. 2 when current flows through the motor power supply line 81. Alternatively, in an eighth embodiment shown in FIG. 12, a motor power supply line 81a for current flowing in a direction opposite to that in the motor power supply line 81 may be provided separately from the motor power supply line 81 so as to rotate the motor 23 in a direction opposite the direction indicated by the arrow F2. In this case, the motor power supply line 81 refers to an electric line in which current flows in the order of the battery 65, the relay 34, the motor 23, and the relay 35, and the motor power supply line 81a refers to an electric line in which current flows in the order of the battery 65, the relay 35, the motor 23, and the relay 34.

In each embodiment, the FET 62 is used as the switching device. However, a bipolar transistor, an IC, or the like may also be used in place of the FET 62 as the switching device.

In each of the embodiments, the motor 23 is used as an actuator. However, the actuator is not limited to the motor 23, and anything that drives the lock pin 21, such as a solenoid, an air cylinder, or the like may be used.

In each embodiment, the comparison of the ID codes is performed by a smart ignition device, which processes a transmission signal transmitted from the portable device 37a through radio waves. However, the portable device 37a may also be a key having an IC chip. In this case, the signal is transmitted when the key is inserted into a key cylinder. The ID codes may be compared by a transponder, which processes the transmission signal. This eliminates the need for the power supply of the portable device.

Although the steering wheel lock apparatus 1 prevents theft of the vehicle by locking the steering shaft 5, the device may be modified, for example, to an electronic travel control device for locking the rotation of the wheels with a locking means corresponding to the lock pin 21 or an electronic shift lock apparatus for locking the switching operation of the shift lever.

What is claimed is:

1. An electronic anti-theft apparatus for preventing theft of a vehicle, comprising:
   a locking means for selectively locking a movable component that is operated when the vehicle is being driven;
   an actuator for moving the locking means; and
   a control circuit including a processor for controlling the actuator, the control circuit including a first power supply line for supplying the actuator with current for moving the locking means, a second power supply line for supplying an electrical component of the vehicle with current to activate the electrical component, a processor supply line for supplying the processor with current, and a switching device for breaking the first power supply line when the vehicle is started;

wherein the processor supply line supplies power to the processor even when the switching device breaks the first power supply line.

2. The electronic anti-theft apparatus according to claim 1, further comprising a lock position detection switch connected in parallel to the switching device, wherein the lock position detection switch is opened when locking with the locking means is released, and is closed when the locking means locks the movable component.

3. The electronic anti-theft apparatus according to claim 2, further comprising a first contact pair arranged in the first power supply line and a second contact pair arranged in the second power supply line, wherein the switching device switches between a first position connecting the first contact pair and a second position connecting the second contact pair.

4. The electronic anti-theft apparatus according to claim 2, further comprising a first contact pair arranged in the first power supply line, wherein the switching device is a relay including a movable terminal selectively connecting the first contact pair and an attraction element for attracting the movable terminal to disconnect the first contact pair when current flows through the second power supply line.

5. The electronic anti-theft apparatus according to claim 2, further comprising a first contact pair arranged in the first power supply line and selectively connected by the switching device, wherein the switching device mechanically switches the second power supply line to a connected state when the first contact pair is disconnected.

6. The electronic anti-theft apparatus according to claim 1, further comprising a first contact pair arranged in the first power supply line and a second contact pair arranged in the second power supply line, wherein the switching device switches between a first position connecting the first contact pair and a second position connecting the second contact pair.

7. The electronic anti-theft apparatus according to claim 1, further comprising a first contact pair arranged in the first power supply line, wherein the switching device is a relay including a movable terminal selectively connecting the first contact pair and an attraction element for attracting the movable terminal to disconnect the first contact pair when current flows through the second power supply line.

8. The electronic anti-theft apparatus according to claim 7, wherein the second power supply line includes a first branch line for supplying the electrical component with current and a second branch line for supplying the attraction element with excitation current.

9. The electronic anti-theft apparatus according to claim 1, further comprising a first contact pair arranged in the first power supply line and selectively connected by the switching device, wherein the switching device mechanically switches the second power supply line to a connected state when the first contact pair is disconnected.

10. The electronic anti-theft apparatus according to claim 1, wherein the switching device is an electrical switching device that is electrically turned ON and OFF, and the control circuit further includes a drive circuit for driving the electrical switching device, the drive circuit driving the switching device to open the first power supply line when receiving an ignition signal, which is generated when the vehicle is started, a drive permission signal, which is generated by the control circuit, and driving the switching device to close the first power supply line when the vehicle is stopped.

11. An electronic anti-theft apparatus for preventing the theft of a vehicle, comprising:

a locking means for selectively locking a movable component that is operated when the vehicle is being driven;

an actuator for moving the locking means;

a control circuit including a processor for controlling the actuator and a processor supply line for supplying the processor with current, wherein the control circuit supplies the actuator with current to actuate the actuator when the lock member locks the movable component and when releasing the locking;

a first power supply line for supplying the actuator with current; and a switching device arranged in the first power supply line for breaking the first power supply line when the locking of the locking means is released and when the vehicle is started;

wherein the processor supply line supplies power to the processor even when the switching device breaks the first power supply line.

12. The electronic anti-theft apparatus according to claim 11, further comprising a second power supply line for supplying an electric component of the vehicle with current to activate the electrical component, wherein the second power supply line is broken by the switching device when the first power supply line is connected by the switching device, and is connected when the first power supply line is broken.

13. The electronic anti-theft apparatus according to claim 11, wherein that the switching device closes the first power supply line when the vehicle is stopped and opens the first power supply line when the vehicle is being driven.

14. The electronic anti-theft apparatus according to claim 11, wherein the switching device is manually operated by a user.

15. The electronic anti-theft apparatus according to claim 11, wherein the switching device electrically opens the first power supply line when the vehicle is being driven.

16. The electronic anti-theft apparatus according to claim 11, wherein the switching device closes the second power supply line and opens the first power supply line when the vehicle is being driven.

17. The electronic anti-theft apparatus according to claim 11, further comprising a verification device connected to the control device for communicating with a portable device recording an ID code that indicates an authorized owner of the vehicle to determine whether the ID code is correct, wherein the control device releases the locking with the locking means when the ID code is correct.

18. The electronic anti-theft apparatus according to claim 11, wherein the movable component is a steering shaft.

19. An electronic anti-theft apparatus for preventing theft of a vehicle, comprising:

a locking means for selectively locking a movable component that is operated when the vehicle is being driven;

an actuator for moving the locking means; and a control circuit for controlling the actuator, the control circuit comprising:

a first power supply line for supplying the actuator with current for moving the movable component;

a second power supply line for supplying an electrical component of the vehicle with current to activate the electrical component;

a switching device for breaking the first power supply line when the vehicle is started, wherein the switching device is an electrical switching device (41) that is electrically turned ON and OFF; and a drive circuit for driving the electrical switching device, the drive circuit driving the switching device to open the first power supply line when receiving an ignition signal, which is generated when the vehicle is started, a drive permission signal, which is generated by the control circuit, and driving the switching device to close the first power supply line when the vehicle is stopped.

\* \* \* \* \*

UNITED STATES PATENT AND TRADEMARK OFFICE
CERTIFICATE OF CORRECTION

PATENT NO.        : 7,049,931 B2  
APPLICATION NO.   : 10/433819  
DATED             : May 23, 2006  
INVENTOR(S)       : Masaki Hayashi et al.

Page 1 of 1

It is certified that error appears in the above-identified patent and that said Letters Patent is hereby corrected as shown below:

Column 3
Line 66, delete "Sa", and insert therefor -- 5a --.

Signed and Sealed this

Twenty-second Day of August, 2006

JON W. DUDAS  
*Director of the United States Patent and Trademark Office*